US010857688B2

(12) United States Patent
Lee (10) Patent No.: US 10,857,688 B2
(45) Date of Patent: *Dec. 8, 2020

(54) METHOD AND SYSTEM OF RIVERING FILTRATION FOR POWER SAW MACHINE

(71) Applicant: Chao-Ying Lee, Riverside, CA (US)

(72) Inventor: Chao-Ying Lee, Riverside, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 15/893,671

(22) Filed: Feb. 11, 2018

(65) Prior Publication Data

US 2019/0248037 A1 Aug. 15, 2019

(51) Int. Cl.
| | | |
|---|---|---|
| *B23D 45/02* | (2006.01) | |
| *B28D 1/04* | (2006.01) | |
| *B28D 7/02* | (2006.01) | |
| *B26D 7/18* | (2006.01) | |

(52) U.S. Cl.
CPC ........... *B26D 7/1845* (2013.01); *B23D 45/02* (2013.01); *B23D 45/021* (2013.01); *B28D 1/04* (2013.01); *B28D 1/047* (2013.01); *B28D 7/02* (2013.01)

(58) Field of Classification Search
CPC ........ B23D 45/02; B23D 45/021; B28D 1/02; B28D 1/04; B28D 1/043; B28D 1/044; B28D 1/047; B28D 7/02; B28D 7/04
USPC .............................................. 125/12, 13.01
See application file for complete search history.

(56) References Cited

U.S. PATENT DOCUMENTS

| 5,205,686 | A | * | 4/1993 | de Caussin | ........ | B23Q 11/0057 |
| | | | | | | 29/DIG. 102 |
| 5,676,124 | A | * | 10/1997 | Lee | ........ | B28D 1/047 |
| | | | | | | 125/13.01 |
| 10,596,725 | B2 | * | 3/2020 | Kasper | ........ | B28D 7/02 |
| 2007/0197139 | A1 | * | 8/2007 | Wise | ........ | B23D 57/0092 |
| | | | | | | 451/41 |
| 2010/0288257 | A1 | * | 11/2010 | Wei | ........ | B28D 1/047 |
| | | | | | | 125/13.01 |
| 2012/0118278 | A1 | * | 5/2012 | La Banco | ........ | B23D 47/025 |
| | | | | | | 125/35 |
| 2013/0055865 | A1 | * | 3/2013 | Sheddy | ........ | B23D 45/02 |
| | | | | | | 83/98 |
| 2014/0261367 | A1 | * | 9/2014 | Ipatenco | ........ | B28D 1/04 |
| | | | | | | 125/13.01 |

(Continued)

FOREIGN PATENT DOCUMENTS

CA            2262332 A1 *  7/2000  ............... B28D 7/02

*Primary Examiner* — Eileen P Morgan
(74) *Attorney, Agent, or Firm* — Raymond Y. Chan; David and Raymond (57) ABSTRACT

A rivering filtration system for a power saw machine includes a filtration tray having a filtration cavity for collecting operation fluid after the operation fluid is delivered onto the cutting blade, and a fluid collecting tray located underneath the filtration tray, wherein the fluid collecting tray has first and second cavities. The filtration tray provides a first filtration stage for filtrating the visible residual particles out from the operation fluid. The fluid collecting tray provides a second filtration stage that the operation fluid is slowly filled in the first cavity from the filtration cavity to ensure slurry residual particles in the operation fluid being deposited at the first cavity, and a third filtration stage that the operation fluid is slowly filled in the second cavity from the first cavity to ensure the slurry residual particles being filtrated out of the operation fluid.

8 Claims, 5 Drawing Sheets

(56) References Cited

U.S. PATENT DOCUMENTS

| | | | |
|---|---|---|---|
| 2015/0367527 A1* | 12/2015 | Elemstrand | B28D 1/047 |
| | | | 125/14 |
| 2015/0367530 A1* | 12/2015 | Vikholm | B28D 1/042 |
| | | | 125/13.01 |
| 2017/0050338 A1* | 2/2017 | Lee | B28D 1/04 |
| 2017/0120477 A1* | 5/2017 | Chang | B28D 1/047 |
| 2018/0053960 A1* | 2/2018 | Patterson, Jr. | H01M 8/2484 |
| 2019/0217404 A1* | 7/2019 | Guth | B23D 59/006 |
| 2020/0016792 A1* | 1/2020 | Chang | B28D 7/04 |
| 2020/0156285 A1* | 5/2020 | Kasper | B23Q 11/0891 |

* cited by examiner

Operation fluid from the cutting blade 11 is ejected tangentially downwards towards the down-sloping channel 22 for funneling the operation fluid.

↓

Pre-filtration stage

Operation fluid as it flows down the down-sloping channel 22 and deposits large debris, most of landing in the down-sloping channel 22 will get stuck here.

↓

Stage 1 filtration

Collection of operation fluid begins at the filtration cavity 21 where the speed of operation fluid slows as it gather in the filtration cavity 21 of the filtration tray 20.

↓

Stage 2 filtration

Operation fluid that overflows from the filtration tray 20 collects in the first cavity 31. In this first cavity 31, operation fluid is free of visible debris/contaminants.

↓

Stage 3 filtration

Operation fluid that overflows from the first cavity 31 collects in the second cavity 32, where the majority of the operation fluid is free of micro debris and is less saturated of slurry reducing fluid pump 15 wear.

↓

Stage 4 filtration

Operation fluid that overflows from the second cavity 32 collects in the fluid collector 40 under the fluid collecting tray 30. The fluid pump 15 can be placed in the fluid collector 40 to pump the operation fluid up to the cutting blade 11.

FIG. 5

METHOD AND SYSTEM OF RIVERING FILTRATION FOR POWER SAW MACHINE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a cutting machine, and more particularly to a method and system of rivering filtration for a power saw machine, which provides multiple filtration stages for detouring and filtering operation fluid during the cutting operation, such that the filtered operation fluid can be immediately re-used for the cutting operation.

Description of Related Arts

Conventional cutting machines are widely used in various industries for provision of rapid and high quality cutting of such construction and manufacturing materials as granite, marble, slate, pave, brick, ceramics, and masonry. A conventional cutting machine generally comprises a cutting platform for supporting a work piece thereon, and a cutter head which is suspended and supported above the cutting platform, wherein the cutter head comprises a cutting blade driven by a motor to cut the work piece laid on the cutting platform. In particular, the cutting blade is rotated at a spin direction to define a front cutting point at the circumferential edge of the cutting blade, wherein the front cutting point of the cutting blade contacts with the work piece to cut through the work piece.

Especially the tile and masonry saws, the motor must provide a higher power to drive the cutting blade to rotate. As the friction between the cutting blade and the work piece generates heat, the cutting machine further comprises a cooling machine to cool down the cutting blade during the cutting operation to prevent the damage of the cutting blade by the heat. Therefore, the cutting machine further comprises a fluid delivering mechanism for cooling and/or lubricating the cutting blade during the cutting operation.

The fluid delivering mechanism is arranged to deliver operation fluid directly onto the cutting blade in the direction of the blade rotation before it is contacted with the work piece, such that the operation fluid will be encouraged to stay on the cutting blade causing over saturation. Accordingly, the operation fluid can be liquid coolant, such as water, and/or lubricant, being delivered onto the cutting blade during the cutting operation. It is worth mentioning that residual particles are formed while the cutting blade is rotatably cutting on the work piece. The residual particles will be spit out of the cutting platform that most of the residual particles are spread at the surroundings. Therefore, the residual particles are considered as one of the pollutions and are hazardous for the user since the residual particles may enter into the user's body during inhalation.

The residual particles can be collected by the operation fluid when the operation fluid is sprayed onto the cutting blade. Then, the operation fluid with the residual particles will be collected at a bottom tray which is located underneath the cutting blade. It is worth mentioning that in order to maintain a higher rotational speed of the cutting blade, the operation fluid must be continuously sprayed onto the cutting blade to cool down the relatively high temperature of the cutting blade during the cutting operation. In other words, a relatively large amount of operation fluid must be prepared for the entire cutting operation. Once the cutting operation is completed, the used operation fluid will be collected in the bottom tray for further treatment. For example, the used operation fluid can be filtrated to filter out the residual particles so that the operation fluid can be re-used for next cutting operation after the filtration treatment.

For the environmental concern, it is a need to have a control of air and land pollution to save our lives. However, the making of the residual particles during the cutting process cannot be avoided. Therefore, a solution must be find out to prevent the residual particles spitting out from the cutting blade and to minimize the amount of operation fluid being used for the cutting operation.

SUMMARY OF THE PRESENT INVENTION

The invention is advantageous in that it provides a method and system of rivering filtration for a power saw machine, which provides multiple filtration stages for detouring and filtering operation fluid during the cutting operation.

Another advantage of the invention is to a method and system of rivering filtration for a power saw machine, wherein the operation fluid filtered by the rivering filtration system can be immediately re-used for the cutting operation.

Another advantage of the invention is to a method and system of rivering filtration for a power saw machine, wherein the rivering filtration system is arranged to control the speed and direction the operation fluid in order to effectively filter out the residual particles, such as debris and slurry, from the operation fluid after used.

Another advantage of the invention is to a method and system of rivering filtration for a power saw machine, wherein different sizes of residual particles are progressively collected through the rivering filtration method for effectively collecting the residual particles from the operation fluid during the cutting process so as to ensure clean operation fluid being re-used.

Another advantage of the invention is to a method and system of rivering filtration for a power saw machine, wherein once the operation fluid is filtrated and clean, the operation fluid is guided back to deliver to the cutting blade for the cutting operation, so as to minimize the usage amount of operation fluid needed to be prepared for the cutting operation.

Another advantage of the invention is to a method and system of rivering filtration for a power saw machine, which is a cost-effective, non-chemical usage and natural treatment technology to treat the operation fluid.

Another advantage of the invention is to a method and system of rivering filtration for a power saw machine, which can effectively collect the residual particles when the work piece is cut by the cutting blade, so as to avoid the air and land pollution.

Another advantage of the invention is to a method and system of rivering filtration for a power saw machine, wherein the rivering filtration system can be incorporated with any existing power saw machine.

Another advantage of the invention is to a method and system of rivering filtration for a power saw machine, which does not require to alter the original structural design of the power saw machine, so as to minimize the manufacturing cost of the power saw machine incorporating with the rivering filtration system.

Another advantage of the invention is to a method and system of rivering filtration for a power saw machine, wherein no expensive or complicated structure is required to employ in the present invention in order to achieve the above mentioned objects. Therefore, the present invention successfully provides an economic and efficient solution for providing an environment friendly configuration for the cleaning the operation fluid.

Additional advantages and features of the invention will become apparent from the description which follows, and may be realized by means of the instrumentalities and combinations particular point out in the appended claims.

According to the present invention, the foregoing and other objects and advantages are attained by a power saw machine, which comprises a cutting head arrangement, an operation fluid delivery arrangement, and a rivering filtration system.

The cutting head arrangement comprises a cutting blade being driven to rotate for contacting with a work piece at a cutting point during a cutting operation. The operation fluid delivery arrangement comprises a fluid nozzle unit for delivering operation fluid onto a cutting edge portion of the cutting blade.

The rivering filtration system is arranged for filtrating residual particles in the operation fluid after the operation fluid is delivered onto the cutting blade, wherein the rivering filtration system comprises a filtration tray supported underneath the cutting blade and a fluid collecting tray located underneath the filtration tray.

The filtration tray has a filtration cavity for collecting operation fluid after the operation fluid is delivered onto the cutting blade, wherein the filtration tray provides a first filtration stage for filtrating the visible residual particles out from the operation fluid.

The fluid collecting tray has first and second cavities, wherein the fluid collecting tray provides a second filtration stage and third filtration stage. At the second filtration stage, the operation fluid is slowly filled in the first cavity from the filtration cavity to ensure slurry residual particles in the operation fluid being deposited at the first cavity. At the third filtration stage, the operation fluid is slowly filled in the second cavity from the first cavity to ensure the slurry residual particles being filtrated out of the operation fluid.

In accordance with another aspect of the invention, the present invention comprises a rivering filtration method of a power saw machine for filtrating operation fluid after the operation fluid is delivered onto a cutting blade of the power saw machine, comprising the following steps.

(A) Collect the operation fluid in a filtrating cavity of a filtration tray which is supported underneath the cutting blade to ensure visible residual particles in the operation fluid being deposited at the filtrating cavity, so as to filtrate the visible residual particles out from the operation fluid by the filtration tray.

(B) Slowly fill the operation fluid in a first cavity of a fluid collecting tray from the filtration tray to ensure slurry residual particles in the operation fluid being deposited at a cavity bottom wall of the first cavity.

(C) Slowing fill the operation fluid in a second cavity from the first cavity to ensure the slurry residual particles being filtrated out of the operation fluid.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
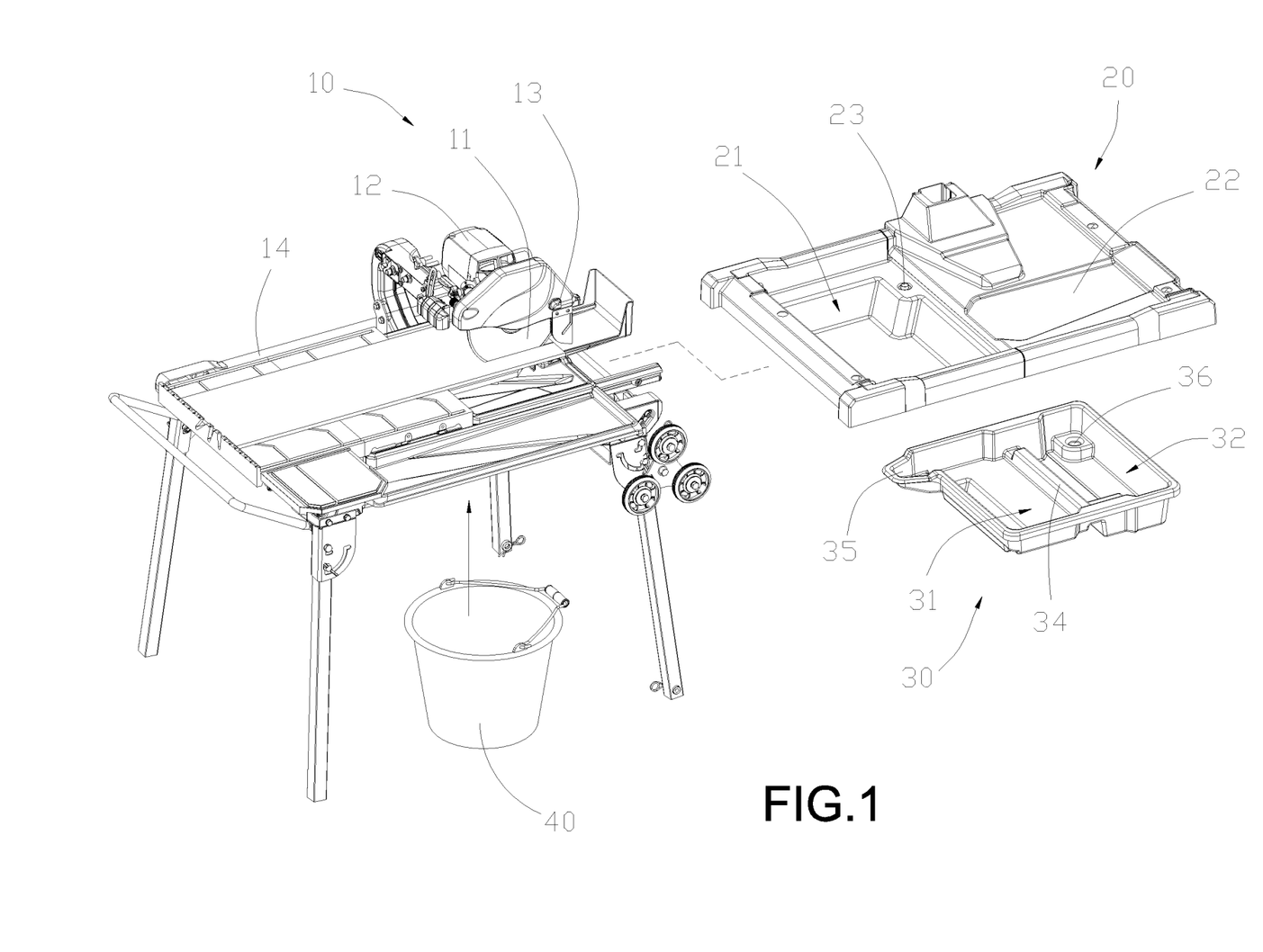
FIG. 1 is an exploded perspective view of a power saw machine with a rivering filtration system according to a preferred embodiment of the present invention.

Referring to FIG. 1 of the drawings, a power saw machine 10 for cutting a work piece according to a preferred embodiment of the present invention is illustrated, wherein the power saw machine comprises a motor assembly, a cutting head arrangement, and a supporting frame 14 for supporting the motor assembly and the cutting head arrangement. Accordingly, the cutting machine can be a hand-held machine, wherein a carrying handle is provided, such that a user is able to carry the cutting machine via the carrying handle to cut the work piece.

According to the preferred embodiment, the cutting machine is embodied as a work station. The cutting head arrangement comprises a cutting blade 11 powered by a motor 12 of the motor assembly, wherein the cutting blade 11 is driven to rotate for contacting with the work piece at a cutting point during a cutting operation. The power saw machine further comprises an operation fluid delivery arrangement comprises a fluid nozzle unit 13 for delivering operation fluid onto a cutting edge portion of the cutting blade. Accordingly, the operation fluid can be liquid coolant, such as water, and/or lubricant, being delivered onto the cutting blade during the cutting operation. Residual particles will be collected by the operation fluid when the operation fluid is sprayed onto the cutting blade during the cutting operation. It is worth mentioning that the operation fluid from the cutting blade 11 is ejected tangentially downwards towards the supporting frame 14.

Figure 3:
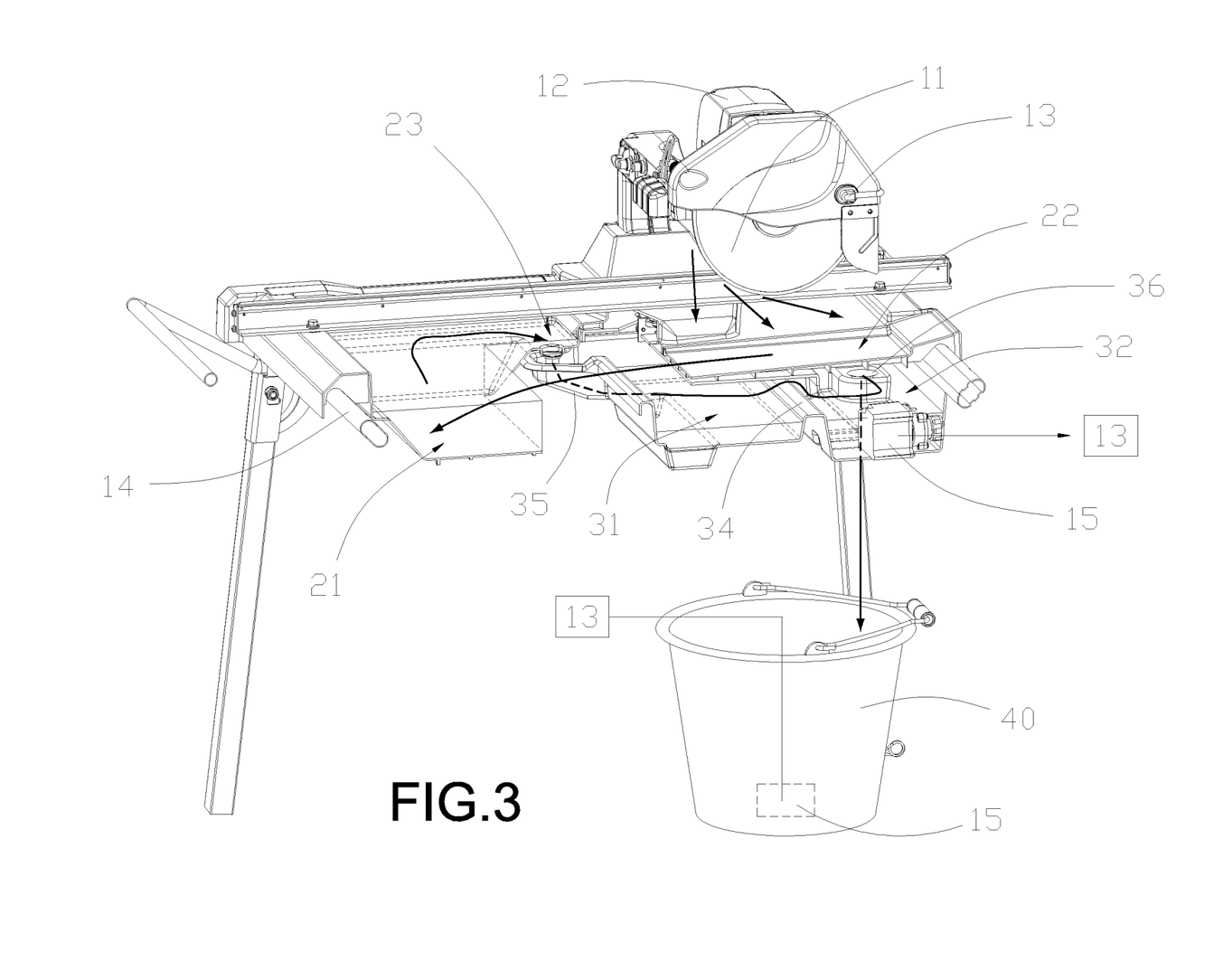
FIG. 3 illustrates a filtration flow of operation fluid by the rivering filtration system according to the above preferred embodiment of the present invention.
Figure 5:
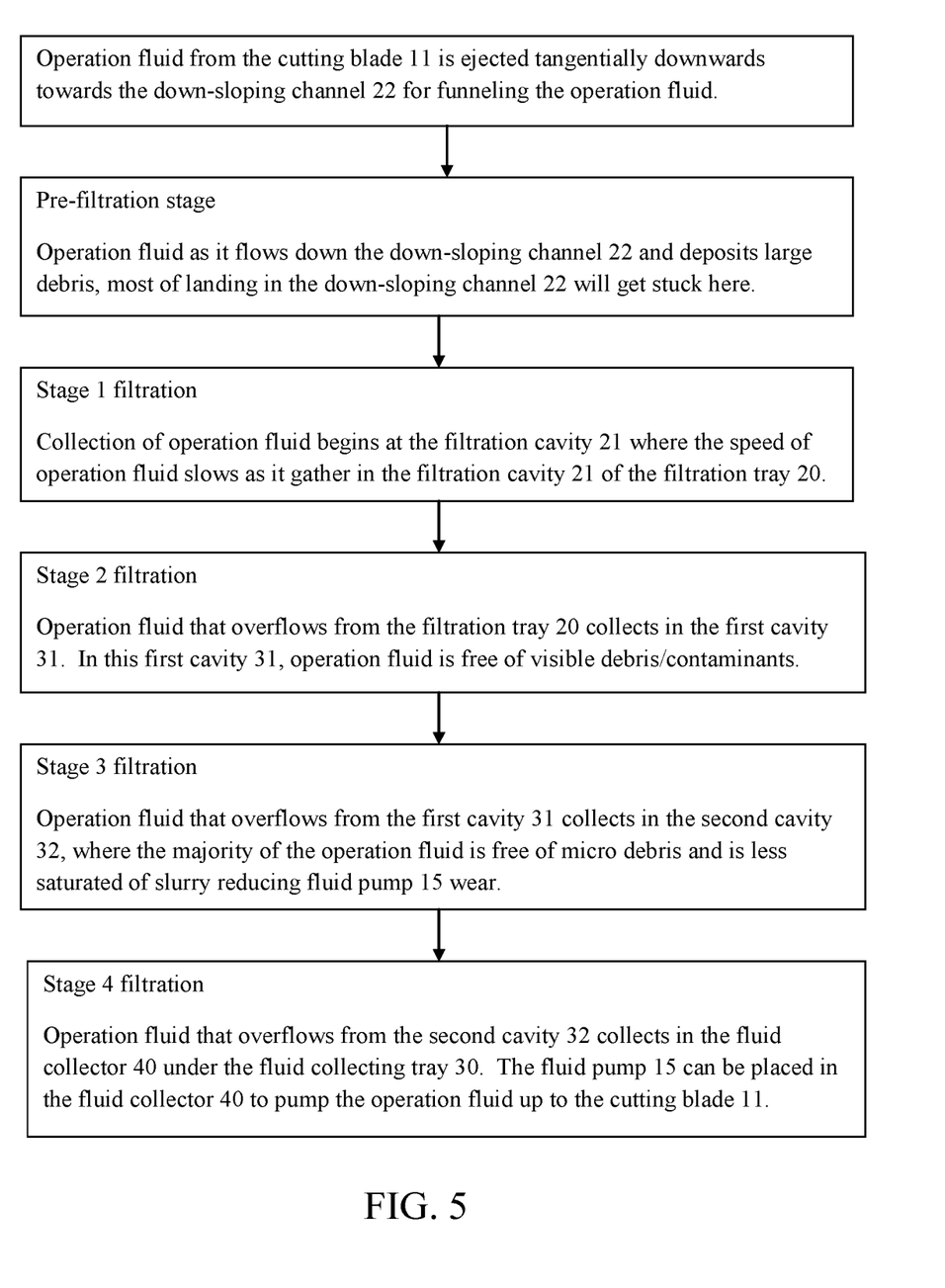
FIG. 5 is a block diagram illustrating a rivering filtration system according to the above preferred embodiment of the present invention.

According to the preferred embodiment, the power saw machine further comprises a rivering filtration system which provides multiple filtration stages for filtrating the residual particles in the operation fluid after the operation fluid is delivered onto the cutting blade, as shown in FIGS. 1, 3 and 5. The rivering filtration system comprises a filtration tray 20 supported underneath the cutting blade 11 and a fluid collecting tray 30 located underneath the filtration tray 20.

As shown in FIG. 3, the filtration tray 20 is detachably coupled to the supporting frame 14 at a position that the filtration tray 20 is located underneath the cutting blade 11, such that the operation fluid from the cutting blade 11 is ejected tangentially downwards towards the filtration tray 20.

The filtration tray 20 has a filtration cavity 21 for collecting the operation fluid after the operation fluid is delivered onto the cutting blade 11, wherein the filtration tray 20 provides a first filtration stage for filtrating the visible residual particles out from the operation fluid. The visible residual particles can be large debris and/or contaminant.

Figure 2:
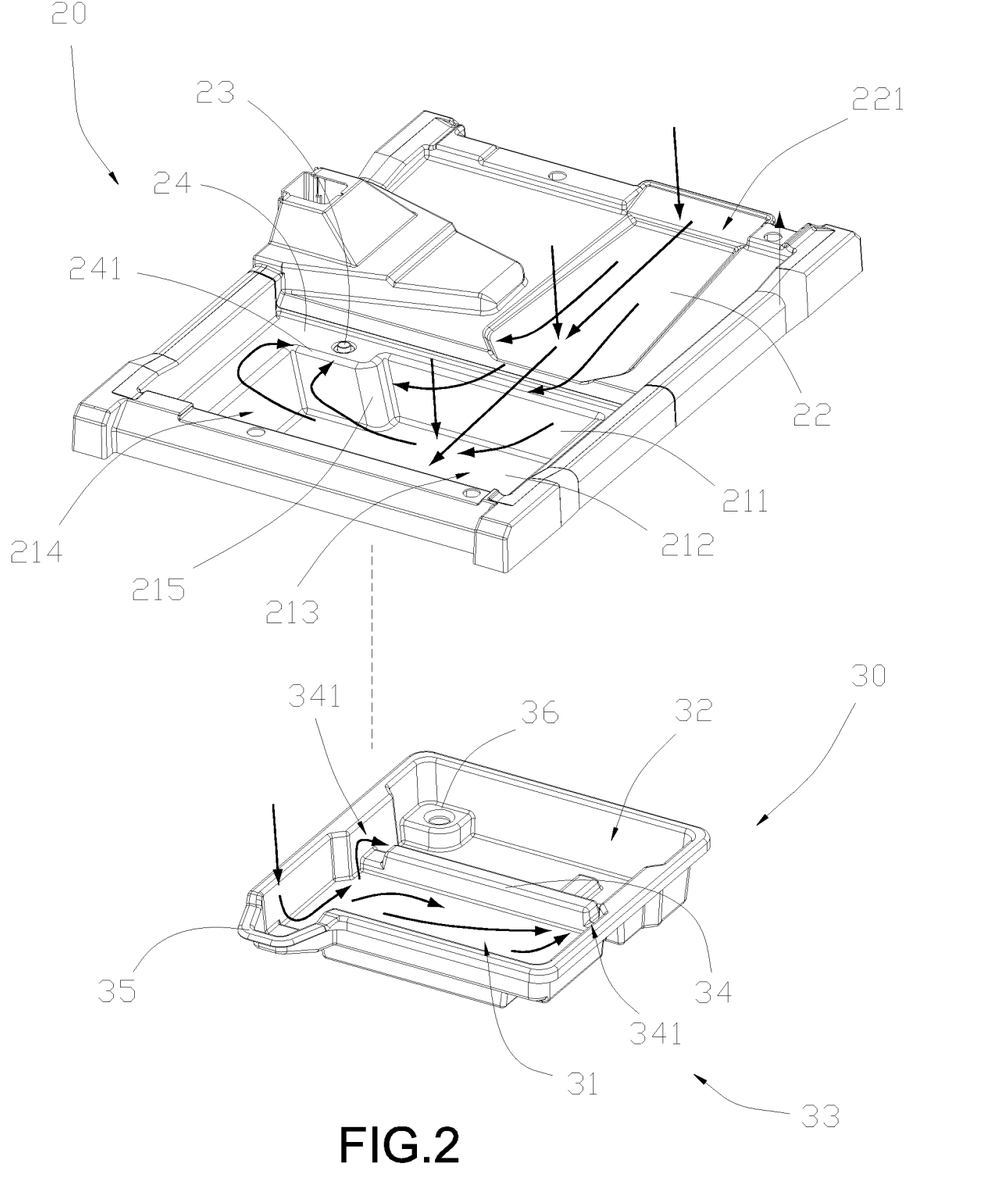
FIG. 2 is an exploded perspective view of the rivering filtration system according to the above preferred embodiment of the present invention.

The filtrating cavity 21 is defined within a cavity surrounding wall 211 and a cavity bottom wall 212. The filtrating cavity 21 further has a first side portion 213 and a second side portion 214 located side-by-side, wherein the operation fluid flows from the first side portion 213 of the filtrating cavity 21 to the second side portion 214 thereof. As shown in FIG. 2, the cavity surrounding wall 211 has a cornering portion 215 formed between the first side portion 213 and the second side portion 214 of the filtrating cavity 21 for detouring the direction of the operation fluid being flowed from the first side portion 213 of the filtrating cavity 21 to the second side portion 214 thereof. In other words, a width of the first side portion 213 of the filtrating cavity 21 is larger than a width of the second side portion 214 of the filtrating cavity 21. It is worth mentioning that a depth of the first side portion 213 of the filtrating cavity 21 is the same as a depth of the second side portion 214 of the filtrating cavity 21. It is appreciated that the depth of the first side portion 213 of the filtrating cavity 21 can be different from that of the second side portion 214 of the filtrating cavity 21.

The filtration tray 20 further has a down-sloping channel 22 for guiding the operation fluid from the cutting blade to flow along the down-sloping channel so as to land a larger size of the residual particle thereon. Particularly, the operation fluid from the cutting blade 11 is ejected tangentially downwards towards the down-sloping channel 22. In other words, majority of operation fluid, i.e. coolant/lubricant and debris, is ejected from the cutting blade 11 along the down-sloping channel 22.

As shown in FIG. 2, an exit of the down-sloping channel 22 is extended to the cavity surrounding wall 211 of the filtrating cavity 21 for guiding the operation fluid being flowed into the filtrating cavity 21 to ensure the residual particles being deposited at the cavity bottom wall 212 of the filtrating cavity 21. The down-sloping channel 22 is transversely extended to the first side portion 213 of the filtrating cavity 21, such that the operation fluid is guided to initially flow along the down-sloping channel 22 to the first side portion 213 of the filtrating cavity 21.

The down-sloping channel 22 has a stairway entrance 221 for speeding up a flow of the operation fluid along the down-sloping channel 22, wherein a width of the down-sloping channel 22 is gradually increased toward the exit thereof. The stairway entrance 221 of the down-sloping channel 22 is formed at a surrounding rim of the filtration tray 20, wherein the down-sloping channel 22 is extended to a position that the exit thereof is extended to the first side portion 213 of the filtrating cavity 21. Therefore, the speed of the operation fluid is increased at the stairway entrance 221 to ensure the operation fluid flowing along the down-sloping channel 22. Then, the speed of the operation fluid is reduced along the down-sloping channel 22 via the increasing width thereof.

The filtration tray 20 further has an overflow drain 23 located above the filtrating cavity 21 for draining the operation fluid out of the filtrating cavity 21 when the operation fluid is overflowed therein, so as to filtrate the residual particles out from the operation fluid. A level of the overflow drain is below a level of the exit of the down-sloping channel. Accordingly, the operation fluid is slowly filled into the filtrating cavity 21 to ensure the visible residual particles in the operation fluid being deposited at the cavity bottom wall 212 of the filtrating cavity 21. In particular, the overflow drain 23 is located at the second side portion 214 of the filtrating cavity 21, wherein the direction of the operation fluid is detoured to flow from the first side portion 213 of the filtrating cavity 21 through the second side portion 214 thereof to the overflow drain 23. The overflow drain 23 is located adjacent to the exit of the down-sloping channel 22, such that the flow direction of the operation fluid along the down-sloping channel 22 is opposite to the flow direction of the operation fluid toward the overflow drain 23. In other words, the operation fluid is guided to flow 180° within the filtration cavity 21.

The filtration tray 20 further has a drain ceiling wall 24 integrally extended from the cavity surrounding wall 211 at the second side portion 213 of the filtrating cavity 21, wherein the overflow drain 23 is formed at the drain ceiling wall 24. The overflow drain 23 is located adjacent to the cornering portion 215 of the filtration cavity 21. It is worth mentioning that the drain ceiling wall 24 is located above the cavity bottom wall 212 of the filtrating cavity 21. The filtration tray 20 further has a raised blocking flange 241 upwardly protruded from the cavity surrounding wall 211 along the drain ceiling wall 24, such that when the operation fluid is overflowed at the filtrating cavity 21, the operation fluid must flow over the raised blocking flange 241 to reach the overflow drain 23.

The fluid collecting tray 30 is detachably coupled underneath the filtration tray 20 is supported by the supporting frame 14 for collecting the operation fluid drained from the overflow drain 23. The fluid collecting tray 30 has first and second cavities 31, 32, wherein the fluid collecting tray 30 provides a second filtration stage and third filtration stage. At the second filtration stage, the operation fluid is slowly filled in the first cavity 31 from the filtration cavity 21 to ensure slurry residual particles in the operation fluid being deposited at the first cavity 31. At the third filtration stage, the operation fluid is slowly filled in the second cavity 32 from the first cavity 31 to ensure the slurry residual particles being filtrated out of the operation fluid.

As shown in FIG. 2, the fluid collecting tray 30 further has a collecting reservoir 33 and a partition wall 34 extended from a bottom of the collecting reservoir 33 for partitioning the collecting reservoir 33 into the first cavity 31 for receiving the operation fluid drained from the overflow drain 23 and the second cavity 32 for receiving the operation fluid from the first cavity 31 when the operation fluid overflows the partition wall 34. Preferably, the partition wall 34 is longitudinally formed at a mid-portion of the fluid collecting tray 30 to partition the collecting reservoir 33 into two even halves i.e. the first cavity 31 and the second cavity 32.

The partition wall 34 has at least a top passing notch 341 indented at a top edge of the partition wall 34 for allowing the operation fluid to flow from the first cavity 31 to the second cavity 32. Preferably, two top passing notches 341 are formed at two ends of the partition wall 34 respectively, such that the operation fluid can flow from the first cavity 31 to the second cavity 32 at two ends of the partition wall 34 along the top passing notches 341.

The operation fluid that overflows from the filtration tray 20 collects in the first cavity 31 where it slowly collects, wherein the operation fluid in the first cavity 31 is free of visible debris and/or contaminants. Then, the operation fluid that overflows from the first cavity 31 collects in the second cavity 32, where the majority of the operation fluid is free of micro debris and is less saturated of slurry reducing fluid pump wear.

As shown in FIG. 2, the fluid collecting tray 30 further comprises an elongated drain collector 35 extended outwardly to align with and located below the overflow drain 23 for guiding the operation fluid from the overflow drain 23 to the first cavity 31. The fluid collecting tray 30 further has a drain hole 36 located at the second cavity 32 and above a bottom wall thereof for draining the operation fluid out of the second cavity 32 when overflowing. Accordingly, the second cavity 32 will be used to further collect sludge deposited as operation fluid drains out via the drain hole 36.

For improving the filtration result, a fluid collector 40, such as a bucket, can be simply placed under the fluid collecting tray 30 to align with the drain hole 36 for collecting the clean and filtrated operation fluid overflowed from the second cavity 32 and drained out from the drain hole 36. In other words, the rivering filtration system of the present invention further provides a fourth filtration stage via the fluid collector 40 to filtrate the operation fluid. Accordingly, the fluid pump 15, such as a water pump, can be placed in the fluid collector 40 for pumping the operation fluid therefrom back to the fluid nozzle unit 13 of the operation fluid delivery arrangement for delivering the clean and filtrated operation fluid onto the cutting blade 11. It is worth mentioning that when the drain hole 36 is closed, the fluid pump 15 can be placed in the second cavity 32 to deliver the operation fluid therein back to the fluid nozzle unit 13. When the drain hole 36 is opened, the fluid pump 15 can be placed the fluid collector 40 to deliver the operation fluid therefrom back to the fluid nozzle unit 13.

Figure 4:
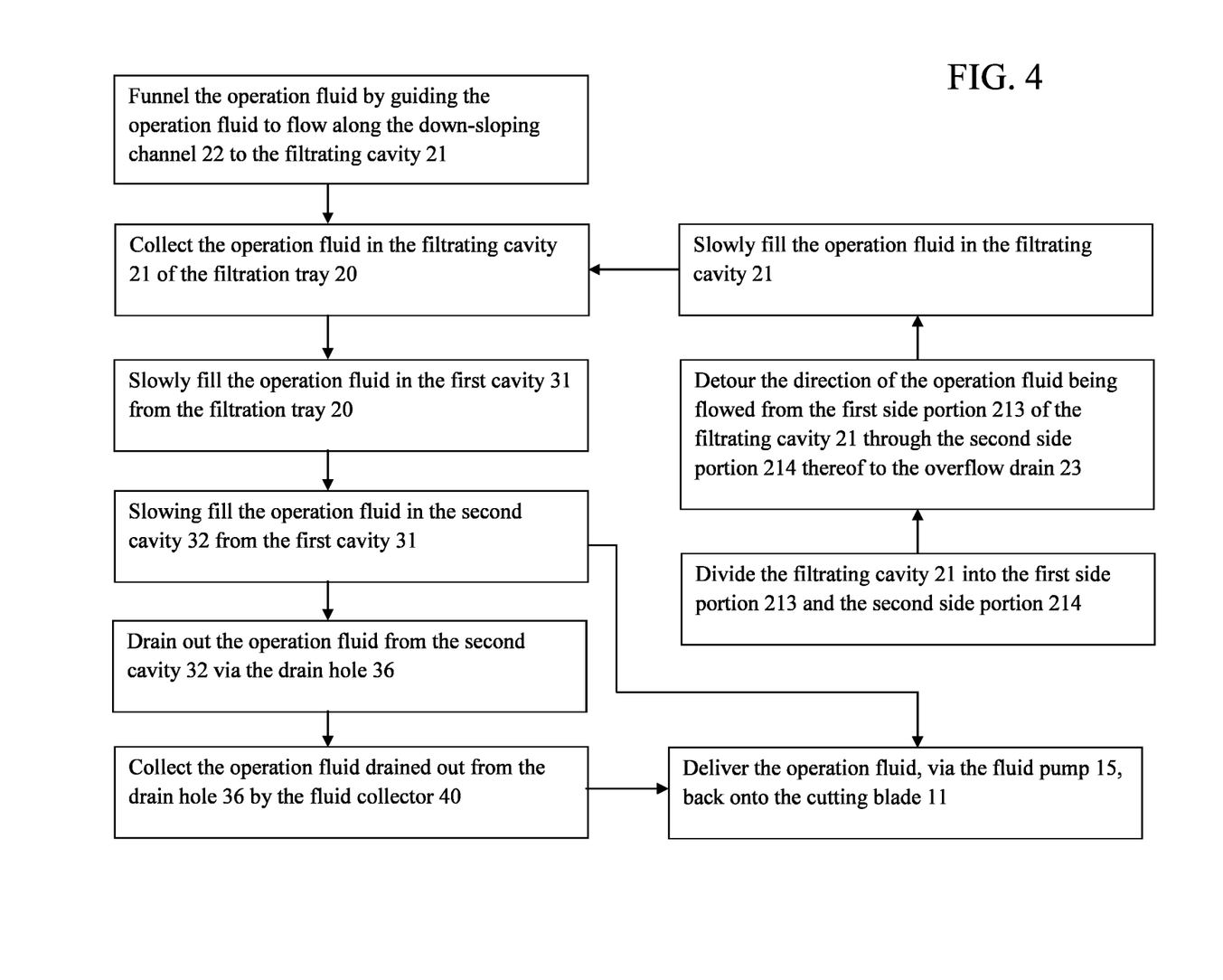
FIG. 4 is a block diagram illustrating a rivering filtration method according to the above preferred embodiment of the present invention.

As shown in FIG. 4, the present invention further comprises a rivering filtration method which comprises the following steps.

(A) Collect the operation fluid in the filtrating cavity 21 of the filtration tray 20 which is supported underneath the cutting blade to ensure the visible residual particles in the operation fluid being deposited at the filtrating cavity 21, so as to filtrate the visible residual particles out from the operation fluid by the filtration tray 20.

(B) Slowly fill the operation fluid in the first cavity 31 of the fluid collecting tray 30 from the filtration tray 20 to ensure the slurry residual particles in the operation fluid being deposited at the cavity bottom wall of the first cavity 31.

(C) Slowing fill the operation fluid in the second cavity 32 from the first cavity 31 to ensure the slurry residual particles being filtrated out of the operation fluid.

The step (A) further comprises the following steps.

(A.1)Slowly fill the operation fluid in the filtrating cavity 21 to ensure the visible residual particles in the operation fluid being deposited at the cavity bottom wall 212 of the filtrating cavity 21, wherein the step (A.1) further comprises the steps of:

(A.1.1) dividing the filtrating cavity 21 into the first side portion 213 and the second side portion 214 that the overflow drain 23 is located at the second side portion 214; and (A.1.2) detouring the direction of the operation fluid being flowed from the first side portion 213 of the filtrating cavity 21 through the second side portion 214 thereof to the overflow drain 23.

(A.2)Drain out the operation fluid from the filtrating cavity 21 via the overflow drain 23 which is located above the filtrating cavity 21 when the operation fluid is overflowed therein, so as to filtrate the visible residual particles out from the operation fluid.

Before the step (A), the method further comprises a step of funneling the operation fluid before filling the operation fluid in the filtrating cavity 21 by guiding the operation fluid to flow along the down-sloping channel 22 to the filtrating cavity 21 so as to land the larger size of the residual particle on the down-sloping channel 22.

After the step (C), the method further comprises the following steps.

(D) When the operation fluid overflows at the second cavity 32, drain out the operation fluid from the second cavity 32 via the drain hole 36.

(E) Collect the operation fluid drained out from the drain hole 36 by the fluid collector 40.

(F) Deliver the operation fluid, via the fluid pump 15, back onto the cutting blade 11 after the operation fluid is collected by the fluid collector 40 by placing the fluid pump 15 in the fluid collector 40.

Alternatively, after the step (c), the method further comprises a step of pumping the operation fluid in the second cavity 32 back to deliver onto the cutting blade 11 by placing the fluid pump 15 in the second cavity 32.

Therefore, the present invention provides a pre-filtration stage, i.e. the funneling step, and four different filtration stages to complete the filtration treatment of the operation fluid as shown in FIG. 5. Therefore, the clean and filtered operation fluid can be immediately re-used for the cutting operation. It is worth mentioning that the rivering filtration system can be incorporated with any existing power saw machine to process the filtration treatment of the operation fluid.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A power saw machine, comprising:
a cutting head arrangement which comprises a cutting blade being driven to rotate for contacting with a work piece during a cutting operation; and
a rivering filtration system for collecting operation fluid and filtrating residual particles in the operation fluid after the operation fluid is delivered onto said cutting blade, wherein said rivering filtration system comprises:
a filtration tray, supported underneath said cutting blade, having:
a down-sloping channel for guiding the operation fluid and the residual particles from said cutting blade flowing along said down-sloping channel;

a filtrating cavity defined within a cavity surrounding wall and a cavity bottom wall, wherein an exit of said down-sloping channel is extended to said cavity surrounding wall for guiding the operation fluid being flowed into said filtrating cavity to ensure the residual particles being deposited at said cavity bottom wall of said filtrating cavity; and an overflow drain formed at a position above said filtrating cavity for draining the operation fluid out of said filtrating cavity when the operation fluid is overflowed therein, so as to filtrate the residual particles out from the operation fluid; and a fluid collecting tray located underneath said filtration tray for collecting the operation fluid drained from said overflow drain, wherein said fluid collecting tray has a collecting reservoir and a partition wall extended from a bottom of said collecting reservoir for partitioning said collecting reservoir into a first tray cavity for receiving the operation fluid drained from said overflow drain and a second tray cavity for receiving the operation fluid from said first cavity when the operation fluid overflows said partition wall.

2. The power saw machine, as recited in claim 1, wherein said partition wall has at least a top passing notch indented at a top edge of said partition wall for allowing the operation fluid to flow from said first tray cavity to said second tray cavity.

3. The power saw machine, as recited claim 1, wherein said fluid collecting tray further comprises an elongated drain collector extended outwardly to align with and positioned below said overflow drain for guiding the operation fluid from said overflow drain to said first tray cavity.

4. The power saw machine, as recited in claim 1, wherein said fluid collecting tray further has a drain hole formed at said second tray cavity and positioned above a bottom wall thereof for draining the operation fluid out of said second tray cavity when overflowing.

5. A rivering filtration system for a power saw machine which comprises a cutting blade, comprising:

a filtration tray arranged for being supported underneath the cutting blade, wherein said filtration tray has a filtrating cavity for collecting an operation fluid after the operation fluid is delivered onto the cutting blade, and an overflow drain formed at a position above said filtrating cavity, wherein said filtration tray provides a first filtration stage for slowly filling the operation fluid in said filtrating cavity to ensure visible residual particles in the operation fluid being deposited at a cavity bottom wall of said filtrating cavity and for draining out the operation fluid from said filtrating cavity via said overflow drain when the operation fluid is overflowed therein, so as to filtrate said visible residual particles out from the operation fluid; and a fluid collecting tray, which is positioned underneath said filtration tray for collecting the operation fluid drained from said overflow drain, having a first tray cavity and a second tray cavity partitioned by a partition wall, wherein said fluid collecting tray provides a second filtration stage that the operation fluid is slowly filled in the first tray cavity from said overflow drain to ensure slurry residual particles of the visible residual particles in the operation fluid being deposited at a bottom wall of said first tray cavity and a third filtration stage that the operation fluid is slowly filled in said second tray cavity from said first tray cavity to ensure said slurry residual particles being filtrated out of the operation fluid.

6. The rivering filtration system, as recited in claim 5, wherein said filtration tray further comprises a down-sloping channel extended to said filtrating cavity for guiding the operation fluid from the cutting blade to flow along said down-sloping channel to said filtrating cavity.

7. The rivering filtration system, as recited in claim 5, wherein said fluid collecting tray further an elongated drain collector extended outwardly to align with and positioned below said overflow drain for guiding the operation fluid from said overflow drain to said first tray cavity.

8. The rivering filtration system, as recited in claim 5, wherein said fluid collecting tray further has a drain hole formed at said second tray cavity and positioned above a bottom wall of said second tray cavity for draining the operation fluid out of said second tray cavity when overflowing.

* * * * *